United States Patent [19]

Steffes

[11] Patent Number: 4,693,523
[45] Date of Patent: Sep. 15, 1987

[54] SLIP CONTROLLED BRAKE SYSTEM FOR AUTOMOTIVE VEHICLES

[75] Inventor: Helmut Steffes, Eschborn, Fed. Rep. of Germany

[73] Assignee: ITT Corporation, New York, N.Y.

[21] Appl. No.: 939,233

[22] Filed: Dec. 9, 1986

Related U.S. Application Data

[63] Continuation of Ser. No. 665,749, Oct. 29, 1984, abandoned.

[30] Foreign Application Priority Data

Nov. 26, 1983 [DE] Fed. Rep. of Germany ....... 3342908

[51] Int. Cl.$^4$ ................................................ B60T 8/44
[52] U.S. Cl. ..................................... 303/114; 303/119
[58] Field of Search ................ 303/10, 113, 114, 115, 303/116, 117, 118, 119; 188/181 R, 181 P; 60/577, 578, 576, 574, 553

[56] References Cited

U.S. PATENT DOCUMENTS

| | | | |
|---|---|---|---|
| 3,521,934 | 7/1970 | Leiber | 303/119 |
| 3,679,270 | 7/1972 | Junia | 303/114 |
| 3,771,839 | 11/1973 | Fink | 303/119 |
| 3,910,643 | 10/1975 | Kobashi et al. | 303/114 |
| 4,346,944 | 8/1982 | Leiber | 303/119 |
| 4,440,454 | 4/1984 | Belart et al. | 303/114 |
| 4,453,782 | 6/1984 | Arikawa et al. | 303/116 |

FOREIGN PATENT DOCUMENTS

| | | |
|---|---|---|
| 0967621 | 5/1975 | Canada ................................. 303/114 |
| 1941098 | 2/1971 | Fed. Rep. of Germany . |
| 2528938 | 1/1977 | Fed. Rep. of Germany . |
| 3010639 | 9/1981 | Fed. Rep. of Germany . |
| 3021116 | 12/1981 | Fed. Rep. of Germany . |
| 3040548 | 5/1982 | Fed. Rep. of Germany . |
| 2086509 | 5/1982 | United Kingdom ................ 303/116 |
| 2086507 | 5/1982 | United Kingdom . |

*Primary Examiner*—John W. Caldwell, Sr.
*Assistant Examiner*—Alvin Oberley
*Attorney, Agent, or Firm*—James B. Raden; William J. Michals

[57] ABSTRACT

A slip-controlled brake system for automotive vehicles comprises a brake booster (1) acting on a tandem master cylinder (7, 7'), of pressure medium lines connecting the tandem master cylinder (7, 7') with the wheel brakes, as well as of controllable multi-directional valves (30, 31, 32, 37, 41, 50, 51, 53) in the pressure medium lines. The tandem master cylinder is composed of a push-rod piston (6, 42) of an intermediate piston (8), as well as of a resetting arrangement (23, 44). Further, an auxiliary pressure source (26), transducers for detecting the rotational behavior of the wheels, and electronic circuits for the evaluation of the measured values and for the generation of valve control signals are included in the brake system. The intermediate piston brake circuit (II) of the brake system is designed as a brake circuit which is static in all operational conditions and the push-rod piston brake circuit (I) is designed as a brake circuit which, in case of control, is dynamic and connectable to a pressure compensation reservoir (13) and to the auxiliary pressure source (26) via multi-directional valves (31, 32). The auxiliary pressure source (26) further communicates with the pressure compensation reservoir (13) by way of a valve (30) and with the resetting arrangement in a directly or by valves.

4 Claims, 4 Drawing Figures

SLIP CONTROLLED BRAKE SYSTEM FOR AUTOMOTIVE VEHICLES

This application is a continuation of application Ser. No. 06/665,749, filed 10/29/84, now abandoned.

BACKGROUND OF THE INVENTION

This invention relates to a slip-controlled brake system for automotive vehicles with a brake booster which acts on a tandem master cylinder substantially consisting of a push-rod piston, an intermediate piston, as well as of a resetting arrangement, with pressure lines connecting the tandem master cylinder with the wheel brakes, with controllable multi-directional valves inserted into the pressure medium lines leading to the wheel brakes and to a pressure compensation and supply reservoir, with an auxiliary pressure source, with transducers for the detection of the rotational behavior of the wheels and with electronic circuits for the evaluation of the measured values and for the generation of valve control signals.

Known brake systems with slip control which are equipped with a tandem master cylinder the two hydraulic circuits of which are connected with the wheel brakes via operable valves. For a pressure reduction at the wheel brake cylinders for the purpose of counteracting an imminent wheel lock-up, by means of the valves, a pressure medium line is released from the respective wheel brake cylinder to the pressure compensation or supply reservoir so as to enable hydraulic medium to run off from the hydraulic brake circuits. So as to avoid a depletion of the hydraulic volume after a repeated pressure reduction, in such systems it is necessary to dynamically supply additional hydraulic medium into the pressurized brake circuits during brake slip control.

The known systems thus require for every controlled hydraulic circuit multi-directional valves which are operable independently of one another. The energy consumption is considerable as the pressure reduction in all circuits is effected by pressure compensation towards the supply reservoir. The measures for the individual control of the braking pressure in the circuits, which are independent of one another, as well as for the generation and supply of the required hydraulic energy, which will be high in particular in unfavorable conditions as in case of icy roads or aquaplaning, thus require a substantial expenditure with regard to pumps, pressure accumulators, etc.

It is thus an object of this invention to develop a reliably working brake system with slip control, which will be up to all requirements, even in unfavorable conditions, which will need a relatively low-power auxiliary pressure source as compared to known systems, and which altogether will but need a small expenditure with regard to components and manufacture.

SUMMARY OF THE INVENTION

It has been found that this object is achieved in a brake system of the type referred to above whose further development consists in that the intermediate piston brake circuit is designed as a brake circuit which will be a static brake circuit in all operational conditions and in that the push-rod piston brake circuit is designed as a brake circuit which will be a static brake circuit before the onset of control and which, however, in case of control will be a dynamic brake circuit connected to the pressure compensation reservoir, on the one hand, and to the auxiliary pressure source, on the other hand, via multi-directional valves, and in that the auxiliary pressure source hydraulically communicates with the pressure compensation reservoir via a multi-directional valve and with the resetting arrangement in a direct manner or, likewise, via a multi-directional valve.

According to an advantageous embodiment of this invention, the auxiliary pressure source substantially consists of an electric-motor-driven hydraulic pump which may be switched on at the onset of slip control and the delivery side of which is communicating with the pressure compensation reservoir by way of a multi-directional valve opened in the rest position, i.e. when slip control is switched off, and/or during pressure reduction.

The brake booster such as a vacuum brake booster directly operated by the foot pedal and of known construction may be used which is characterized by a high degree of reliability and small constructional expense.

In the simplest embodiment, according to the present invention, the pressure will be controlled directly in the brake circuit, which is dynamic in case of control, and indirectly in the static brake circuit, i.e. by pressure transmission via the floating intermediate piston. The pressure variation in this embodiment will approximately be the same at all wheels. By inserting 2/2-way valves, which are open in the initial or rather in the rest position, into the individual pressure medium lines leading to the wheel brakes, according to this invention, however, in a simple manner it will be possible to achieve a far-reaching decoupling of the pressure variation and an individual control in the individual brake circuits. By switching over and locking these additional multi-directional valves the braking pressure will namely be kept constant at the associated wheel while now in the other circuits the braking pressure may be built up or reduced, if necessary, with a delay.

According to a further advantageous embodiment of this invention, the resetting arrangement substantially consists of a positioning sleeve arranged on the push-rod piston and pressurizable in the resetting direction upon the metered pressure supply from the auxiliary pressure source into a first annular chamber confined between the cylinder housing, the surface of the push-rod piston, and a front face of the sleeeve, with the positioning sleeve coming to abut on a radial expansion of the push-rod piston and thus transmitting the setting pressure on to the push-rod piston, said expansion serving as stop and being arranged between the sleeve and the brake booster.

Further, according to another example of an embodiment, a second annular chamber is provided which lies on the booster side and is confined by the housing, the push-rod piston, and the front face of the positioning sleeve which faces the booster, on the master cylinder side a second radial expansion being arranged on the push-rod piston and serving as stop, against which expansion the positioning sleeve will come to abut upon metered pressure supply into the second annular chamber.

It is also possible to design the positioning sleeve and the push-rod piston in one piece.

Despite its simplicity, the inventive brake system may be used both for brake slip control and for control of the traction slip, namely by pressure supply from the auxiliary pressure source into the second annular chamber.

Thus, this invention is based on the finding that there may be a considerable reduction in the number of the required braking pressure control valves without any disturbing restrictions on control possiblities if, a tandem master cylinder being used, dynamic control is limited to the push-rod piston brake circuit and if control of the intermediate piston brake circuit is only a static control. Thanks to this measure and by connecting a simple brake booster upstream, in particular by connecting a vacuum booster upstream, a low requirement will result with regard to the output to be rendered by the auxiliary pressure source. Energy accumulators, relief valves, and intricate and expensive monitoring devices become dispensable in the control circuit. It will be sufficient to use a hydraulic pump as auxiliary pressure source which will not be switched on before the occurrence of a lock-up danger and the onset of brake slip control, especially since brake slip control on principle will start with a pressure reduction. Thus it will be sufficient to build up the auxiliary pressure in a delayed manner.

BRIEF DESCRIPTION OF THE DRAWING

Further characteristics, advantages, and applications of this invention will become evident from the following description of several embodiments, reference being made to the accompanying drawing figures in which.

DETAILED DESCRIPTION

Figure 1:
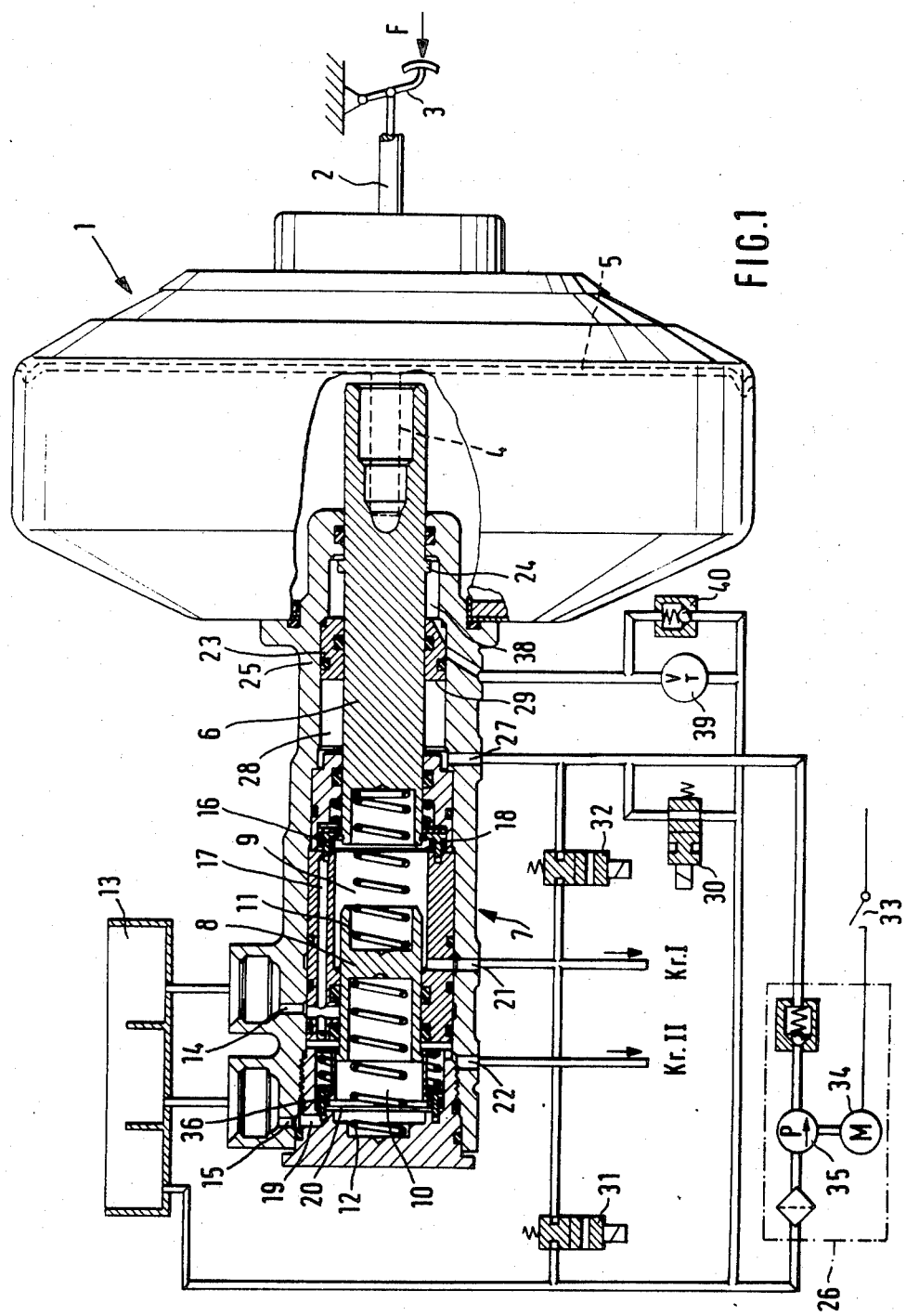
FIG. 1 is the schematical simplification and, partially, the symbolical representation of a particularly simple embodiment of an inventive brake system.

According to FIG. 1 the brake system of the present invention consists of a vacuum brake booster 1 acted upon by the pedal force F via the indicated piston rod 2 and the pedal 3 symbolically represented.

By way of a push-rod 4 which is indicated only by means of broken lines and is fastened to the working piston or to the diaphragm 5 of the vacuum booster 1, the operating force F is transmitted in a booster manner to a push-rod piston 6 forming part of a tandem master cylinder the whole of which is marked 7. A second piston 8 within the master cylinder 7, said piston usually being referred to as intermediate piston, transmits the pressure to the second pressure chamber 10, said pressure having been built up in a first working chamber or pressure chamber 9 upon the application of the brake. Although the two pressure chambers 9 and 10 and the brake circuits I and II connected thereto are hydraulically separated the pressure will be the same in the two working chambers, provided the effective surfaces are the same. The relatively weak springs 11 and 12 only serve to return the pistons after the release of the brake.

Via the two ports 14 and 15, via the valves 16, 36 only open in the release position of the brake, and via the inner channels 17, 18 and 19, 20 an associated pressure compensation reservoir 13 is communicating with respectively one working chamber 9 and 10, at a time. In this arrangement, said pressure compensation reservoir 13 is subdivided into several chambers so as to ensure that in case of a leak pressure medium will leak out of the respective circuit, only. The connection of the working chambers 9, 10 to the brake circuits I, II is established via the ports 21, 22.

The push-rod piston 6 carries a positioning sleeve 23 coming to abut on the radial expansion 24 of the push-rod piston 6 as soon as, upon the application of the brake, the push-rod piston 6 will have travelled about 40% of its operating stroke into the example of an embodiment shown above. In the represented release position of the brake the push-rod piston 6 abuts on the right-hand limitation of the cylinder housing 25.

For the purpose of resetting the push-rod piston 6, via the valve arrangement described hereinafter, pressure is supplied from an auxiliary pressure source 26 into an annular chamber 28 via the port 27 in the cylinder housing 25. The pressure acts on the front face 29 of the positioning sleeve 23, said front face 29 being adjacent to the annular chamber 28. Thereby, the push-rod piston 6 is moved back until its above-mentioned '40%' position. The transmission of the resetting force from the sleeve 23 to the piston 6 is effected via the expansion 24.

For the control of the brake slip, in the example of an embodiment according to FIG. 1, only three 2/2-way valves 30, 31 and 32 are required in combination with the auxiliary pressure source 26. In this configuration, the following mode of operation results.

Slip control will be switched on if a lock-up danger is detected by means of sensors not illustrated here and generating signals corresponding to the rotational behavior of the individual wheels and by means of an electronic combination and evaluation circuit likewise not illustrated. To this end, via the electric switch 33, the drive motor 34 of the pump 35 will be started, at the same time the electromagnetically operable 2/2-way valve 30 being switched over. Thereby, the hydraulic communication will be interrupted between the auxiliary pressure source 26 and the pressure compensation reservoir 13 so that the pump 35 may build up pressure in the line system leading to the port 27 and to the annular chamber 28. The pressure reduction in brake circuit I for eliminating the lock-up danger will be initiated by the switching-over of the 2/2-way valve 31. Thereby pressure medium may flow off from the brake circuit I into the compensation reservoir. As long as the 2/2-way valve 32 will continue to be closed the auxiliary pressure building up in the line system after an unavoidable delay will effect a reduction of the braking pressure in circuit I via the resetting arrangement.

A controlled reincrease of the braking pressure may be achieved by switching back the valve 31 into its initial position and by switching over the valve 32 so as to be open.

Due to the floating arrangement of the intermédiate piston 8 in the tandem master cylinder 1 the pressure variation will also be transmitted to the static brake circuit II via the piston 8. To this end, in the static circuit (brake circuit II) it will thus not be necessary to tap pressure medium and to supply additional pressure medium.

Figure 2:
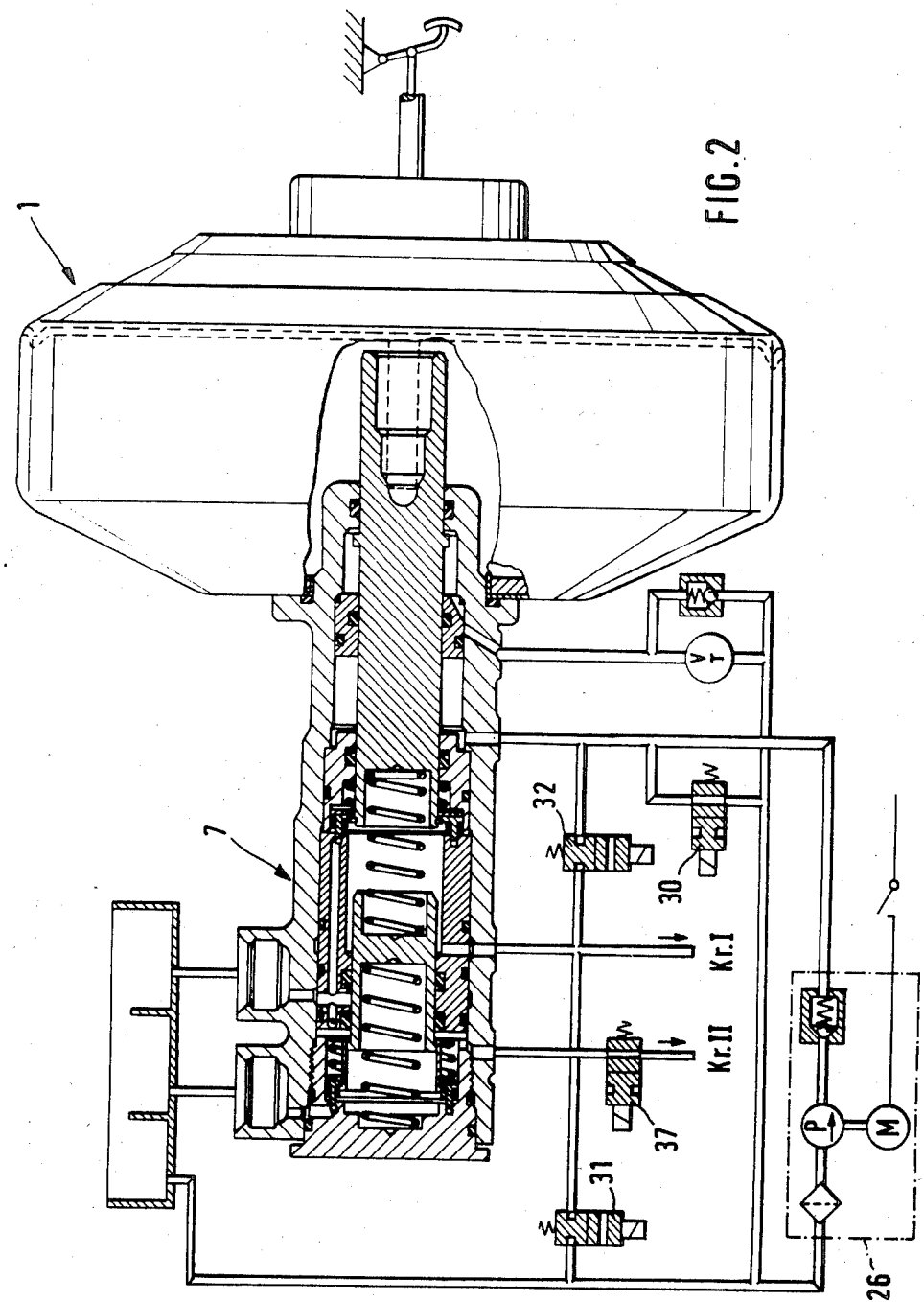
FIG. 2 is the same representation of the brake system according to FIG. 1 with expanded control possibilities.

Whereas the embodiment according to FIG. 1 which confines itself to three 2/2-way valves 30, 31, 32 only will permit a more or less one-channel control, a small additional effort, i.e., the insertion of a further 2/2-way valve into the static circuit II, will render possible a far-reaching decoupling of the pressure variation in the brake circuits I and II. This is illustrated by FIG. 2. The valve 37 opened in the initial or rather rest position namely permits to keep the braking pressure constant in the circuit II, irrespectively of the pressure increase or reduction in the brake circuit I.

For the rest, the system according to FIG. 2 is identical with the brake system according to FIG. 1.

For the purpose of attenuation of the resetting force acting on the piston 6 and for the purpose of avoiding too vehement a resetting which wold be awkward to the driver the annular chamber 38, which expands upon brake application and leftward displacement of the positioning sleeve 23, is communicating with the pressure compensation reservoir 13 via throttle 39. A non-return valve 40 is provided in parallel with said throttle. Said non-return valve 40 enables an unhindered influx of pressure medium from the reservoir 13 into the bore 38.

Figure 3:
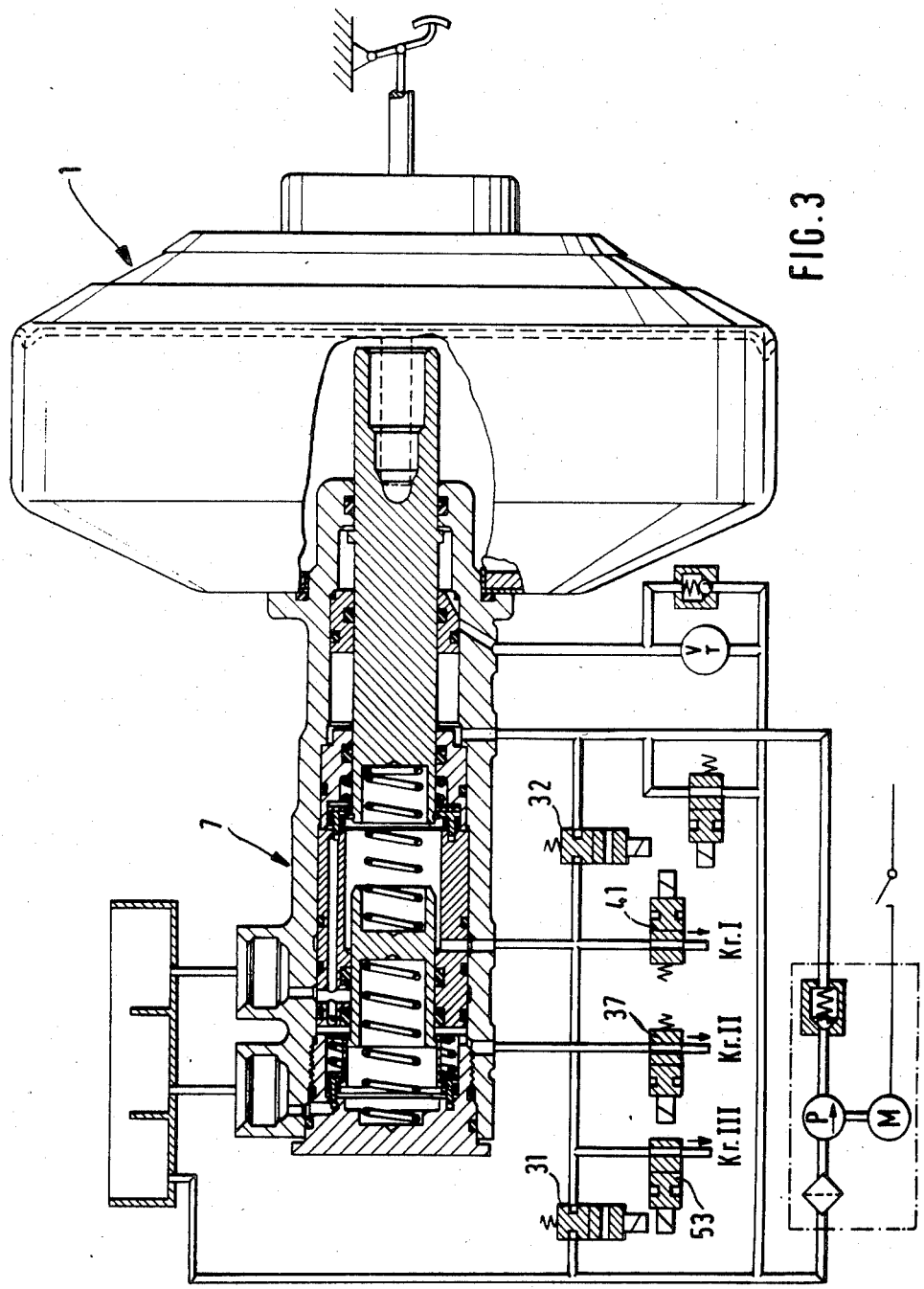
FIG. 3 is a further addition to a brake system according to FIG. 1.

An independence of the braking pressure variation in the dynamic and static brake circuits 1 and 2, respectively, which will be sufficient for all cases of control will be achieved according to FIG. 3 by the insertion of a separate 2/2-way valve 37, 41, 53 in each brake circuit, said 2/2-way valves 37, 41, 53 being open in the rest position. As illustrated in FIG. 3, it even is possible to connect a third brake circuit III and, if necessary, also a fourth controllable circuit to the dynamic or to the static circuit via a 2/2-way valve 53. Thanks to the independent control of the valves, thanks to the variation of the duration of the flow phases in relation to the locking phases of the individual valves, thanks to cyclic variation of the actuating pressure, and thanks to delayed operation of the valves 37, 41, 53 directly leading to the wheel brakes, etc. it will be possible to adjust a very differentiated braking pressure variation at the individual wheel brakes.

For the rest, the embodiment according to FIG. 3 corresponds to the brake system according to FIG. 1, thus reference being made to the details described with regard to FIG. 1.

Figure 4:
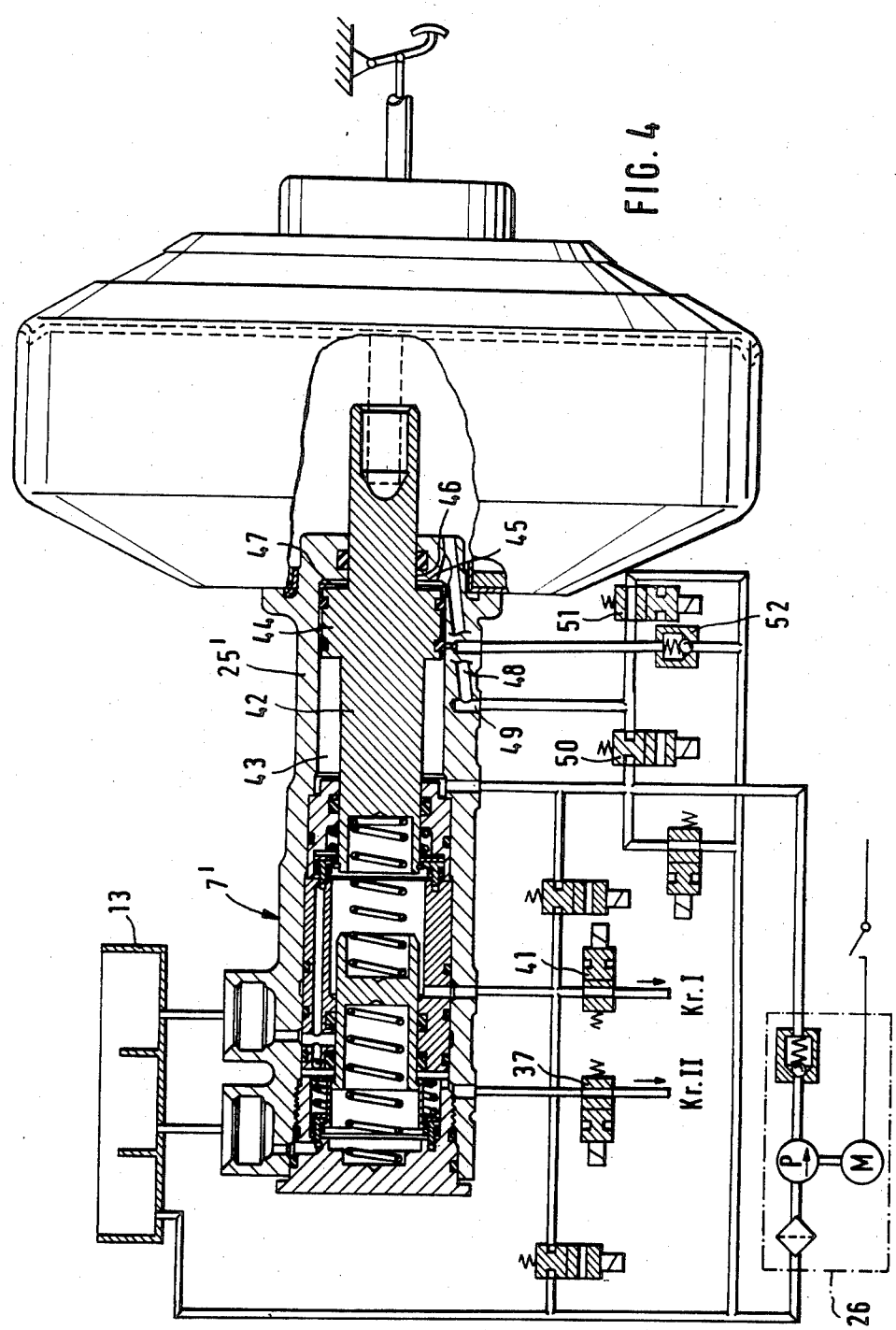
FIG. 4 is the same kind of representation as in FIG. 1, showing another embodiment of a brake system according to this invention.

The embodiment of this invention illustrated in FIG. 4 is suitable for control both of the brake slip and of the traction slip. In this case, the positioning sleeve 23 is combined with the push-rod piston 42 to form a one-piece unit. For the purpose of resetting the piston 42 into the initial position shown in FIG. 4, again a metered supply of pressure is required to take place from the auxiliary pressure source 26 into the first annular chamber 43 arranged on the side of the tandem master cylinder7'. As compared with the embodiment according to FIG. 1, in the construction according to FIG. 4 a return into the initial position will be achieved as, in contrast to the positioning sleeve 23 of FIG. 1, the expanded-diameter portion 44 of the push-rod position 42 limits the travel of the push-rod piston 42 by means of its stop at the right-hand housing wall 45.

For control of the traction slip a second annular chamber 47 is formed within the cylinder housing 25' between the housing wall, the right-hand front face of the radially expanded portion 44, and the adjacent surface area 46 of the stepped push-rod piston 42. Via the port 49 and the inner channel 48 pressure may be supplied from the auxiliary pressure source 26 into the second annular chamber 47. For controlling the pressure supplied for traction slip control, according to FIG. 4, two 2/2-way valves are inserted. Out of these two valves a valve 50 closed in the rest position will establish communication to the auxiliary pressure source 26 and a 2/2-way valve 51 opened in the rest position will establish communication to the pressure compensation reservoir 13.

For the purpose of attenuating the resetting, in this case, also a throttle is provided which will connect the annular chamber with the pressure compensation reservoir 13, said annular chamber having been released in the applied position of the brake by means of the displacement of the push-rod piston 42.

According to FIG. 4, the left annular chamber 43 into which pressure is supplied from the auxiliary pressure source 26 for the purpose of resetting the push-rod piston 42 is directly communicating with the auxiliary pressure source 26, i.e., no valve is inserted which may be switched over into a locking position. A displacement of the push-rod piston 42 in the working direction for the limitation or rather for the control of the traction slip is nevertheless possible as the right-hand annular chamber 47 has a larger pressure-applied surface than the left-hand annular chamber 43 whose pressure-applied surface at the expansion 44 of the stepped push-rod piston 42 is descisive for the value of the resetting force. Thanks to this simple measure the number of the required valves or rather the number of operable hydraulic connections is reduced down to a minimum.

What is claimed is:

1. A slip-controlled brake system for an automotive vehicle having vehicle wheels, said system comprising, in combination:

a pedal-operated brake booster;

a tandem master cylinder connected to said brake booster by a push-rod of a push-rod piston operating adjacent a first pressure chamber in said tandem master cylinder and said tandem master cylinder having an intermediate piston coupled to said push-rod piston and operating adjacent a second pressure chamber in said tandem master cylinder;

first and second hydraulic brake circuits respectively connected between said first and second chambers and said vehicle wheels;

an annular chamber surrounding said push-rod piston in said master cylinder;

said push-rod piston including radial expansion means intermediate its extremities thereby limiting movement of said push-rod piston within said chamber;

an auxiliary pressure source connected to said annular chamber in said master cylinder;

means for activating said auxiliary pressure source during slip control;

a resetting sleeve means mounted on said push-rod piston and sealably axially moveable within said annular chamber in a substantially unencumbered fashion relative to said push-rod piston, and means for increasing and directing auxiliary pressure into said annular chamber from said auxiliary pressure source whereby said sleeve means contacts said radial expansion means and moves said push-rod piston toward said brake booster;

an ambient pressure compensation reservoir;

a plurality of sensors respectively coupled to said vehicle for providing electrical signals indicative of the rotational behavior of said wheels;

means coupled to said sensors for providing output signals indicative of said rotational behavior;

a first valve connected in a fluid line extending between said auxiliary pressure source and said reservoir, said first valve being normally open to permit free passage of said increased auxiliary pressure from said auxiliary pressure source directly to said reservoir in the absence of output from said sensors, but, said first valve being responsive to said output signals to close during slip control;

a second valve connected in a fluid line extending between said reservoir and said first chamber, said second valve being normally closed and being responsive to said output signals to open during slip control after closure of said first valve, said first valve providing direct access of said auxiliary pressure to reset the push-rod and to further provide dynamic control for slip control by means of a third valve connected in a fluid line extending between said auxiliary pressure source and said first chamber, said third valve being normally closed and being responsive to said output signals to open after said second valve reverts to its normally closed state;

whereby, said output signals and said three valves dynamically control said first hydraulic brake circuit during slip control and overide the static braking effect of said booster.

2. The slip controlled brake system according to claim 1 including a fourth valve in said second hydraulic brake circuit, said fourth valve being normally open and being responsive to said output signals to selectively close said fourth valve during slip control.

3. The slip controlled brake system according to claim 2, including a fifth valve in said first hydraulic brake circuit, said fifth valve being normally open and being responsive to said output signals for selectively closing said fifth valve during slip control.

4. The slip controlled brake system according to claim 1 wherein said annular chamber is of substantially greater axial extent than said sleeve means, secondary port means communicating with said annular chamber adjacent said booster and connected to said auxiliary pressure source whereby pressure can be applied to the opposite side of said sleeve to thereby serve as a dampening means to said sleeve when it is resetting said push-rod piston.

* * * * *